(12) United States Patent
Nakanishi et al.

(10) Patent No.: US 6,741,310 B1
(45) Date of Patent: May 25, 2004

(54) IN-PLANE SWITCHING LIQUID CRYSTAL DISPLAY

(75) Inventors: Yohei Nakanishi, Kawasaki (JP); Seiji Tanuma, Kawasaki (JP); Takatoshi Mayama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/439,607

(22) Filed: Nov. 12, 1999

(30) Foreign Application Priority Data

Nov. 13, 1998 (JP) ............................................. 10-324127

(51) Int. Cl.[7] ........................ G02F 1/1337; G02F 1/137
(52) U.S. Cl. ........................ 349/141; 349/129; 349/124; 349/177
(58) Field of Search ................................. 349/141, 124, 349/128, 129, 177, 123, 143

(56) References Cited

U.S. PATENT DOCUMENTS

| | | | | |
|---|---|---|---|---|
| 5,464,669 A | * | 11/1995 | Kang et al. | 349/124 |
| 5,499,126 A | * | 3/1996 | Abileah et al. | 349/106 |
| 5,737,051 A | * | 4/1998 | Kondo et al. | 349/149 |
| 5,745,207 A | * | 4/1998 | Asada et al. | 349/141 |
| 6,040,887 A | * | 3/2000 | Matsuyama et al. | 349/110 |
| 6,128,061 A | * | 10/2000 | Lee et al. | 349/141 |
| 6,184,961 B1 | * | 2/2001 | Ham | 349/141 |
| 6,266,116 B1 | * | 7/2001 | Ohta et al. | 349/141 |
| 6,342,937 B2 | * | 1/2002 | Hiroshi | 349/128 |

FOREIGN PATENT DOCUMENTS

| | | |
|---|---|---|
| JP | 7036058 | 2/1995 |
| JP | 7159786 | 6/1995 |
| JP | 9043589 | 2/1997 |
| JP | 9061842 | 3/1997 |
| JP | 9080436 | 3/1997 |
| JP | 9160048 | 6/1997 |
| JP | 9171187 | 6/1997 |
| JP | 9258269 | 10/1997 |
| JP | 9269504 | 10/1997 |
| JP | 9325346 | 12/1997 |

* cited by examiner

Primary Examiner—Robert H. Kim
Assistant Examiner—Tai Duong
(74) Attorney, Agent, or Firm—Greer, Burns & Crain, Ltd.

(57) ABSTRACT

A liquid crystal display device includes a liquid crystal layer confined between first and second substrates, an electrode formed on the first substrate so as to create an electric field acting generally parallel to a plane of the liquid crystal layer, and a plurality of pixels being defined in the liquid crystal layer, wherein each of the pixels includes therein a plurality of domains having respective orientations for liquid crystal molecules, such that the orientation is different between a domain and another domain within the plane of the liquid crystal layer.

5 Claims, 13 Drawing Sheets

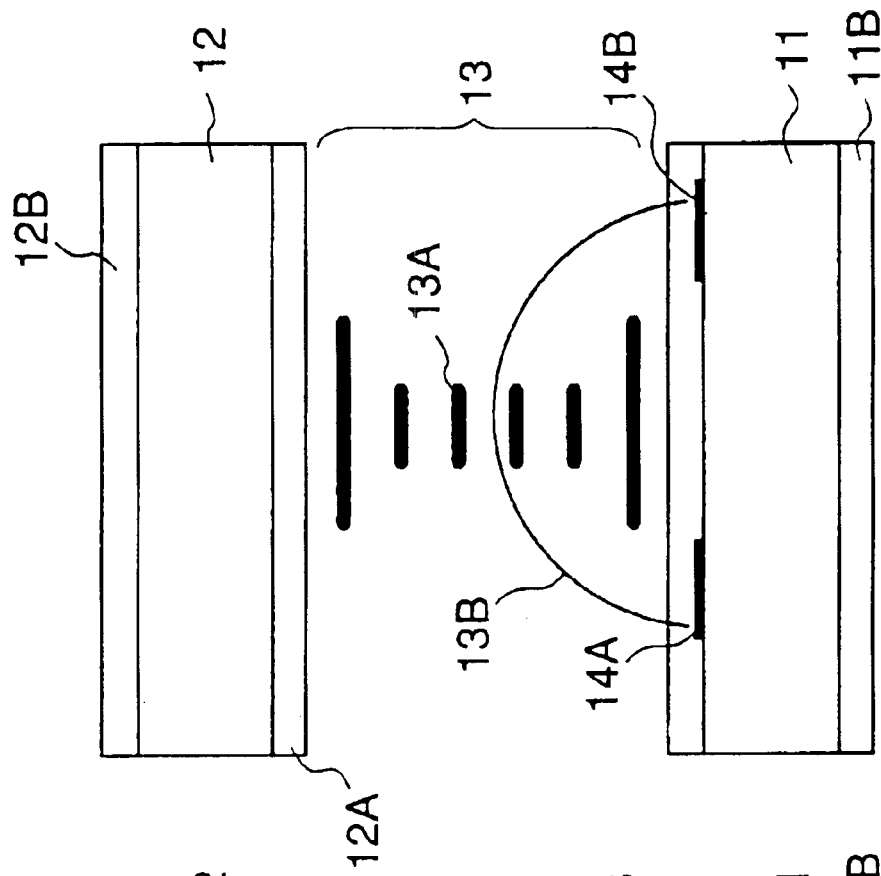
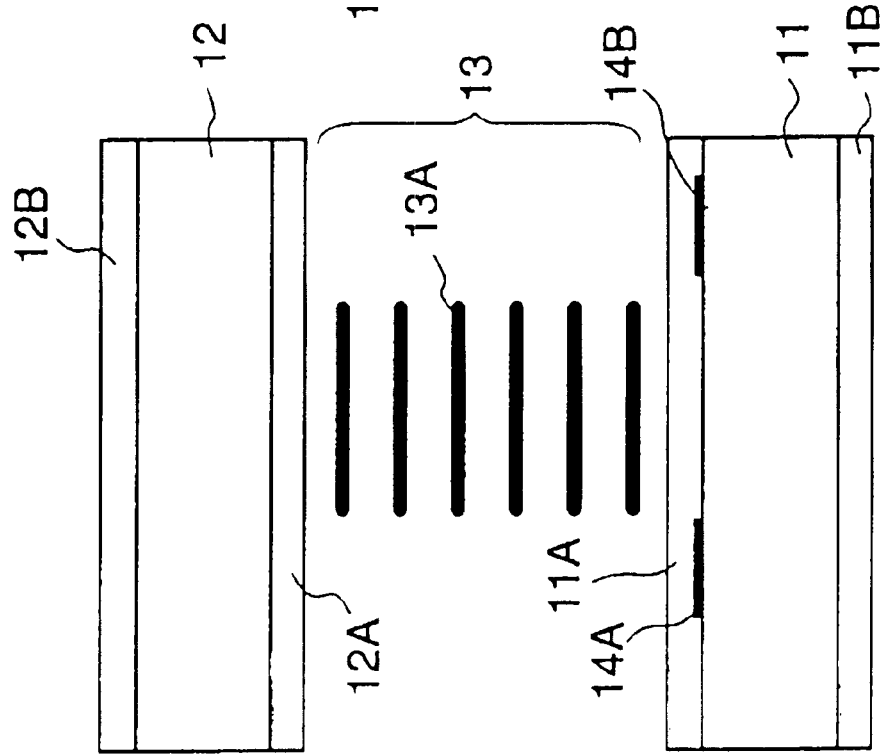

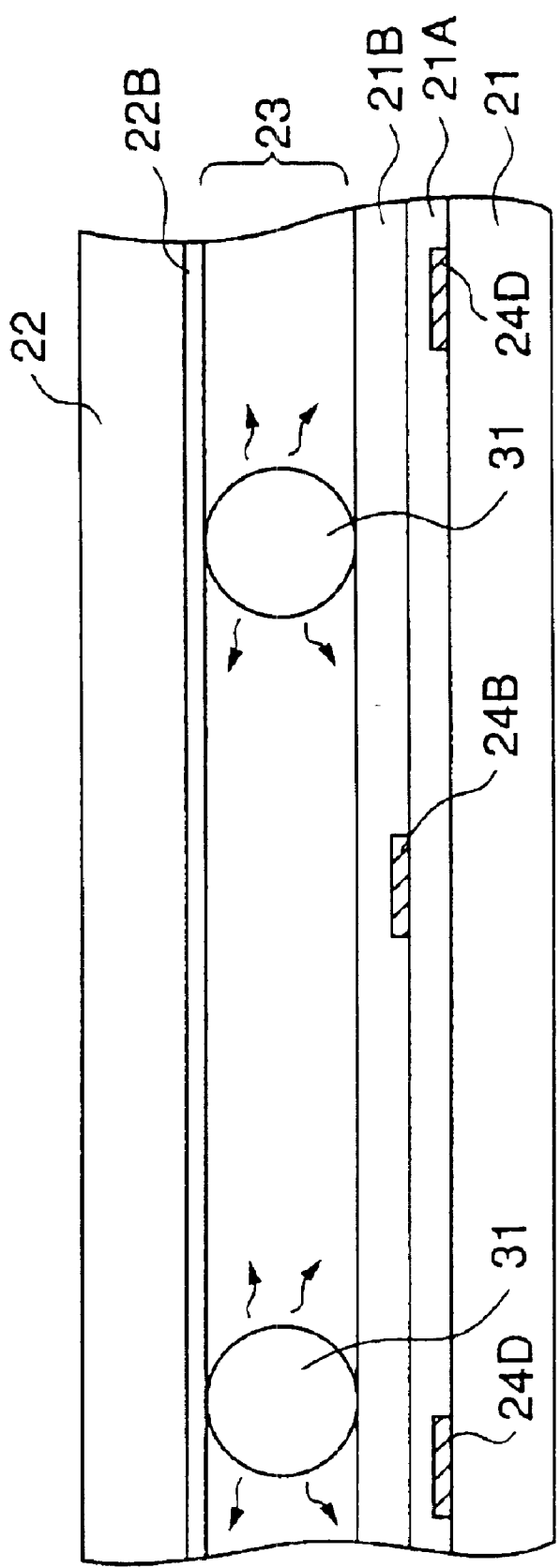

IN-PLANE SWITCHING LIQUID CRYSTAL DISPLAY

BACKGROUND OF THE INVENTION

The present invention generally relates to liquid crystal display devices and more particularly to an in-plane switching liquid crystal display device. An in-plane switching liquid crystal display device is a device driven by an electric field acting parallel to the liquid crystal layer forming the liquid crystal display device.

Conventionally, driving of a liquid crystal display device has been achieved by applying an electric field to a liquid crystal layer confined by a pair of substrates such that the electric field acts perpendicularly to the liquid crystal layer. On the other hand, there is a proposal of a so-called in-plane switching (IPS) liquid crystal display device, in which an electric field is applied to the liquid crystal layer such that the electric field acts in the direction parallel to the substrates. In such an IPS liquid crystal display device, an interdigital electrode is provided on one of the foregoing substrates.

FIGS. 1A and 1B show the principle of such an IPS liquid crystal display device.

Referring to FIG. 1A, a liquid crystal layer 13 containing therein liquid crystal molecules is confined between a pair of mutually opposing glass substrates 11 and 12 in such a manner that the liquid crystal layer makes an intimate contact with a molecular alignment film 11A covering the substrate 11 and also an intimate contact with a molecular alignment film 12A covering the substrate 12. Further, polarizers 11B and 12B are disposed at respective outer sides of the glass substrates 11A and 11B in a crossed Nicol state. Further, a pair of electrodes 14A and 14B are provided on the glass substrate 11 in a state that the electrodes 14A and 14B are covered by the molecular alignment film 11A.

In the non-activated state of FIG. 1A, there is no driving voltage applied across the electrodes 14A and 14B and the liquid crystal molecules 13A of the liquid crystal layer 13 are aligned in a predetermined direction in a plane generally parallel to the substrates 11 and 12.

In the activated state of FIG. 1B, on the other hand, a driving voltage is applied across the electrodes 14A and 14B, and an electric field is induced in the liquid crystal layer 13 in the direction generally parallel to the liquid crystal layer 13. As a result of the electric field, the direction of the liquid crystal molecules 13A, or molecular orientation, is changed. An IPS liquid crystal display device achieves the desired optical switching by using such a change of the molecular orientation of the liquid crystal molecules 13A. Due to the fact that the change of the molecular orientation occurs in the plane parallel to the liquid crystal layer 13, an IPS liquid crystal display device generally provides a superior viewing angle as compared with the conventional twist-nematic (TN) liquid crystal display devices.

On the other hand, such an IPS liquid crystal display device, lacking an electrode on the opposing substrate 12 contrary to a conventional TN liquid crystal display device, tends to induce polarization in the molecular alignment film 12A, while such a polarization induced in the molecular alignment film 12A tends to cause the problem of image sticking or afterimage, in which the represented image tends to remain after the image has been changed. This problem of image sticking becomes particularly acute when the liquid crystal display device is used to display an image for a prolonged time period.

In order to eliminate the problem of image sticking, it is necessary to use a low-resistance liquid crystal having a resistance lower than the resistance of the liquid crystal used in a conventional TN liquid crystal display device, for the liquid crystal layer 13. However, such a liquid crystal having a low resistance generally has a large dielectric constant and tends to dissolve impurities. In other words, a low-resistance liquid crystal is vulnerable to contamination. Such a contamination may come from the sealing material of the liquid crystal display device or from the molecular alignment film. Once the liquid crystal is contaminated, the representation performance of the liquid crystal display device is severely deteriorated.

Further, it should be noted that the electric field 13B induced in the liquid crystal layer 13 in the driving state of the liquid crystal display device is not exactly parallel to the plane of the liquid crystal layer 13 in the vicinity of the electrode 14A or 14B. This means that the electric field component parallel to the plane of the liquid crystal layer 13 becomes small and the response speed of the liquid crystal molecules 13A becomes accordingly small in the vicinity of the electrodes 14A and 14B.

Thus, there is an acute demand of improved performance for the conventional IPS liquid display device.

SUMMARY OF THE INVENTION

Accordingly, it is a general object of the present invention to provide a liquid crystal display device wherein the foregoing problems are eliminated.

The present invention provides a liquid crystal display device, comprising:

first and second, mutually opposing substrates;

a liquid crystal layer confined between said first and second substrates;

an electrode formed on said first substrate so as to create an electric field acting generally parallel to a plane of said liquid crystal layer; and a plurality of pixels being defined in said liquid crystal layer, each of said plurality of pixels including therein a plurality of domains having respective orientations for liquid crystal molecules, such that said orientation is different between a domain and another domain within said plane of said liquid crystal layer.

According to the present invention, it is possible to improve the response speed of the IPS liquid crystal display device, by providing domains in each of the pixels in the liquid crystal layer such that the molecular orientation is different between a domain and another domain when compared in the plane of the liquid crystal layer. More specifically, the present invention achieves the desired improvement of response by twisting the liquid crystal molecules, in the non-activated state of the liquid crystal display device, such that the molecular orientation of the liquid crystal molecules in the domain adjacent to the electrode is closer to the molecular orientation in the activated state of the liquid crystal display device, as compared with the molecular orientation of the liquid crystal molecules in the domain far from the electrode. As a result, the liquid crystal molecules adjacent to the electrode are aligned in the activated direction immediately upon application of the driving voltage to the electrode, in spite of the fact that the electric field component included in the plane of the liquid crystal layer is small in the vicinity of the electrode.

Other objects and further features of the present invention will become apparent from the following detailed description when read in conjunction with the attached drawings.

BRIEF DESCRIPTION OF THE DRAWINGS

FIGS. 1A and 1B are diagrams showing the principle of a conventional IPS liquid crystal display device;

FIG. 5 is a diagram showing the construction of an IPS liquid crystal display device according to a third embodiment of the present invention;

DETAILED DESCRIPTION OF THE PREFERRED EMBODIMENT

First Embodiment

Figure 2A:
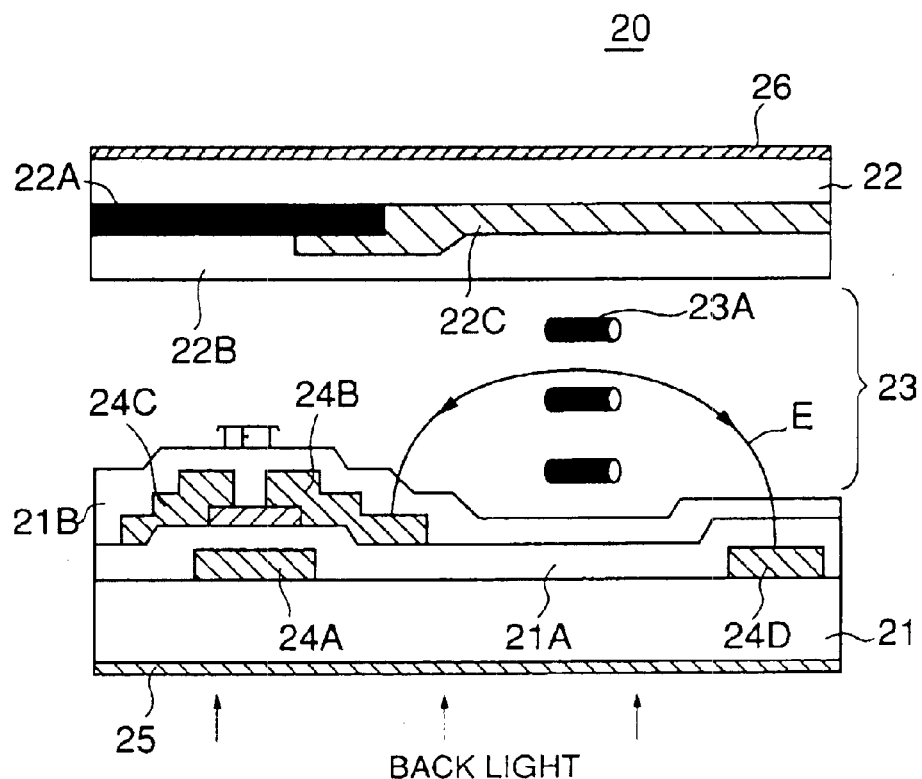
FIGS. 2A and 2B are diagrams showing the construction of an IPS liquid crystal display device according to first and second embodiments of the present invention.
Figure 2B:
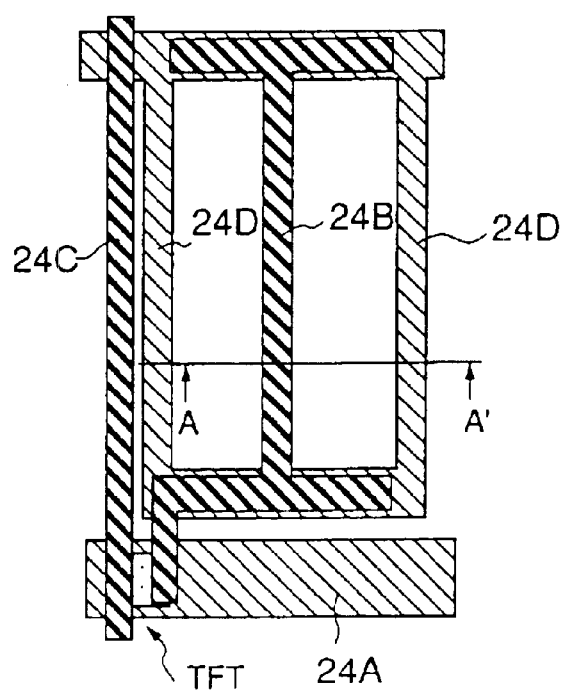

FIGS. 2A and 2B show the construction of an IPS liquid crystal display device 20 according to a first embodiment of the present invention.

Referring to FIG. 2A, the liquid crystal display device 20 includes a pair of mutually opposing glass substrates 21 and 22, and a liquid crystal layer 23 is confined in a space formed between the glass substrates 21 and 22. Further, the glass substrate 21 carries thereon a TFT (thin-film transistor) having a gate electrode 24A, a pixel electrode 24B and a source electrode 24C.

As represented in FIG. 2A, the gate electrode 24A is covered by an insulation film 21A provided on the glass substrate 21 and constituting the gate insulation film of the TFT, wherein the foregoing pixel electrode 24B and the source electrode 24C are both formed on the insulation film 21A. Further, the glass substrate 21 carries thereon an opposing electrode 24D with a separation from the pixel electrode 24B in the state that the opposing electrode 24D is covered by the insulation film 21A.

It should be noted that the foregoing TFT is covered by a molecular alignment film 21B provided on the insulation film 21A, and the liquid crystal layer 23 is formed in an intimate contact with the molecular alignment film 21B. In the foregoing construction, a pixel region is defined between the pixel electrode 24B and the opposing electrode 24D.

On the opposing substrate 22, on the other hand, there is provided an opaque mask pattern 22A in correspondence to the TFT on the substrate 21, and a color filter 22C is formed on the substrate 22 adjacent to the opaque mask pattern 22A, such that the color filter 22C is located in correspondence to the pixel region defined in the substrate 21 between the electrode 24B and the electrode 24D. The color filter 22C thus formed is covered by a molecular alignment film 22B, wherein the molecular alignment film 22B is provided such that the molecular alignment film 22B makes an intimate contact with the liquid crystal layer 23 in the state that the molecular alignment film 22B faces the molecular alignment film 21B formed on the glass substrate 21.

Further, the liquid crystal display device 20 includes a polarizer 25 on the lower surface of the glass substrate 21 and an analyzer 26 on the top surface of the glass substrate 22 in a crossed Nicol state in which the optical absorption axes of the polarizer 25 and the analyzer 26 intersect perpendicularly.

FIG. 2B shows the electrode pattern of the liquid crystal display device 20 in a plan view.

Referring to FIG. 2B, each of the TFTs is formed at an intersection of a gate bus line which corresponds to the gate electrode 24A and a source bus line which corresponds to the source electrode 24C, and the pixel electrode 24B and the opposing electrode 24D extend parallel with each other in the elongating direction of the source bus line.

In the liquid crystal display device 20 having such a construction, an electric field acting generally parallel to the plane of the liquid crystal layer 23 is induced between the pixel electrode 24B and the opposing electrode 24D in response to the turning-ON of the TFT, and the electric field thus induced causes a change in the orientation of the liquid crystal molecules 23A constituting the liquid crystal layer 23 in the plane of the liquid crystal layer 23. In response to such a change in the orientation of the liquid crystal molecules, the optical beam passing through the liquid crystal display device 20 is turned on and off.

Figure 3A:
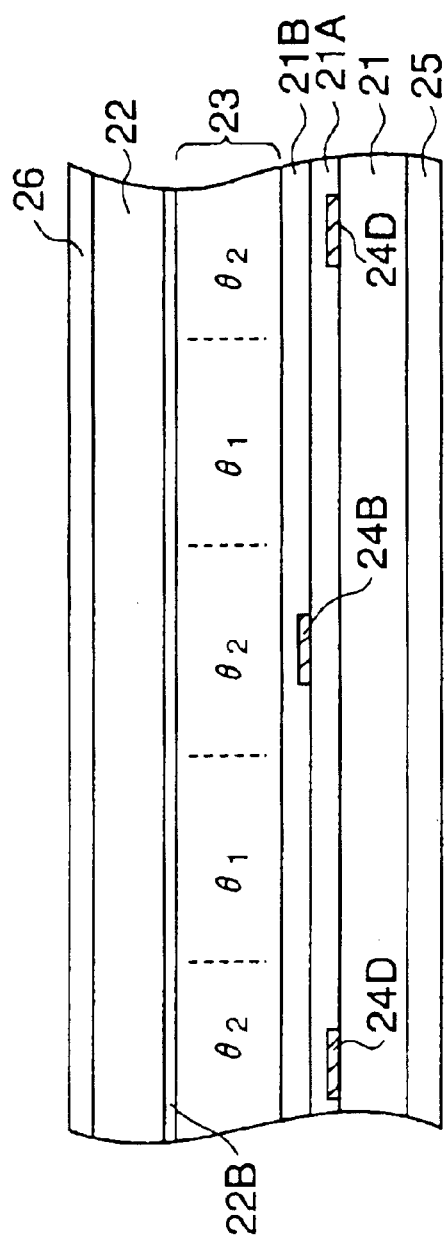
FIGS. 3A and 3B are diagrams showing the construction of an IPS liquid crystal display device of the first embodiment.
Figure 3B:
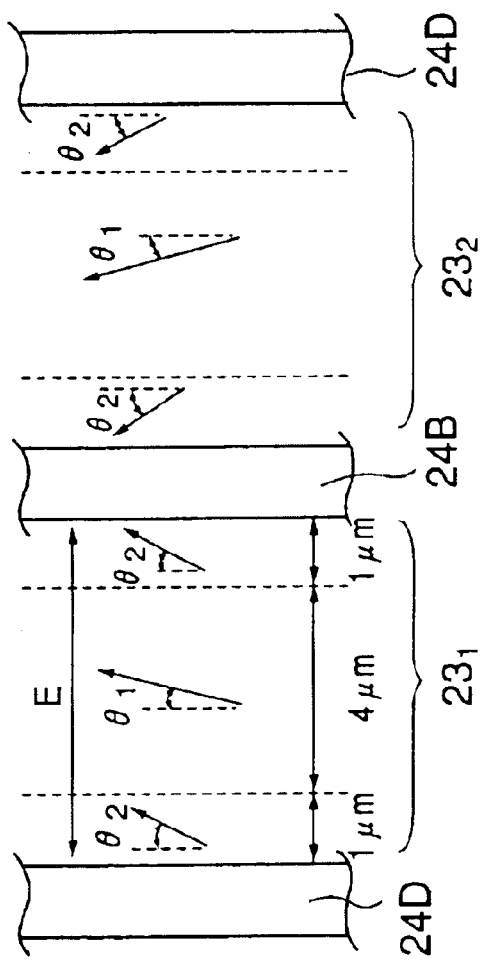

FIG. 3A shows the liquid crystal display device 20 in a cross-section taken along a line A–A' of FIG. 2B, while FIG. 3B shows a plan view corresponding to FIG. 3A.

Referring to FIGS. 3A and 3B, there are formed pixel regions $23_1$ and $23_2$ between the pixel electrode 24B and the opposing electrodes 24D formed adjacent to the pixel electrode 24B at respective opposite sides thereof, wherein each of the pixel regions $23_1$ and $23_2$ includes a pair of sub-regions or domains $\theta_2$, one adjacent to the electrode 24B and the other adjacent to the electrode 24D, and another sub-region or domain $\theta_1$ is formed in the same pixel region $23_1$ or $23_2$ between a pair of the sub-regions $\theta_2$ thus formed. Thus, each of the pixel region $23_1$ or $23_2$ of the present embodiment has a domain structure formed of the sub-regions $\theta_1$ and $\theta_2$.

As represented in FIG. 3B, the liquid crystal molecules 23A, more specifically the elongating direction of the liquid crystal molecules 23A, forms an angle $\theta_1$ of typically about 15° in the non-activated state of the liquid crystal display device with respect to the elongating direction of the pixel electrode 24B, and thus the elongating direction of the source bus line 24C, in the sub-region $\theta_1$. On the other hand, in the sub-region $\theta_2$, the liquid crystal molecules 23A forms an angle $\theta_2$ of typically about 30° with respect to the elongating direction of the source bus line 24C in the non-activated state of the liquid crystal display device.

Thus, it can be seen that the liquid crystal molecules 23A form, in the non-activated state of the liquid crystal display device 20, an angle of about 75° with respect to the direction of the electric field E formed between the electrode 24B and the electrode 24D in the sub-region $\theta_1$, while the angle of the liquid crystal molecules 23A with respect to the electric field E becomes about 60° in the sub-region $\theta_2$.

By setting the direction of the liquid crystal molecules 23A for the non-activated state of the liquid crystal display device 20 to be closer to the activated direction of the liquid crystal molecules 23A, which is realized in the activated state of the liquid crystal display device 20, it becomes possible to align the liquid crystal molecules quickly in the desired activated direction corresponding to the activated state of the liquid crystal display device 20 upon the activation of the liquid crystal display device 20. In other words, the liquid crystal display device 20 of the present embodiment shows an improved response speed.

In fact, it was confirmed, in an IPS liquid crystal display device having a resolution of 640×480 pixels and constructed according to FIGS. 3A and 3B, in that the sum of the turn-on response time $t_{on}$ and the turn-off response time $t_{off}$ is reduced to 50 ms. It should be noted that this value is a substantial improvement over the conventional value of 60 ms. In this experiment conducted by the inventor, a liquid crystal mixture exclusively formed of a fluoric liquid crystal component and a neutral liquid crystal component is used in combination with a molecular alignment film supplied from Japan Synthetic Rubber, K. K. under the trade name of AL1054. The foregoing liquid crystal mixture used in the experiment has a dielectric anisotropy $\Delta\epsilon$ of 8.0 and the initial resistivity of about $1\times10^{14} \Omega cm$. Further, the sub-regions or domains $\theta_1$ and $\theta_2$ of FIGS. 3A and 3B are formed by a rubbing process conducted under existence of a mask.

In the construction of FIGS. 3A and 3B that includes the sub-regions $\theta_1$ and $\theta_2$, in which the direction of alignment of the liquid crystal molecules is changed between the sub-regions $\theta_1$ and $\theta_2$, it is inevitable that leakage of light occurs to some extent. In view of this, it is preferable to set the width of the sub-region $\theta_2$ to be less than about 1 $\mu$m. In this case, the width of the sub-region $\theta_1$ $_{becomes}$ 4 $\mu$m as represented in FIG. 3B, assuming that the pixel region $23_1$ or $23_2$ has a width of 6 $\mu$m. Further, the sub-region $\theta_2$ may be covered by the opaque mask 22A provided on the opposing substrate 26 for cutting the leakage of the light caused in the sub-region $\theta_1$. In this case, the sub-region $\theta_1$ becomes the effective pixel region. Smaller the sub-region $\theta_2$, larger than the effective pixel region $\theta_1$.

In the construction of FIGS. 3A and 3B, the direction of alignment of the liquid crystal molecules are set generally symmetric about the pixel electrode 24B in the pixel region $23_1$ and the pixel region $23_2$ that are disposed adjacent to the pixel electrode 24B. By setting the direction of the liquid crystal molecules as such, the viewing-angle characteristic of the liquid crystal display device 20 is improved further.

Figure 4A:
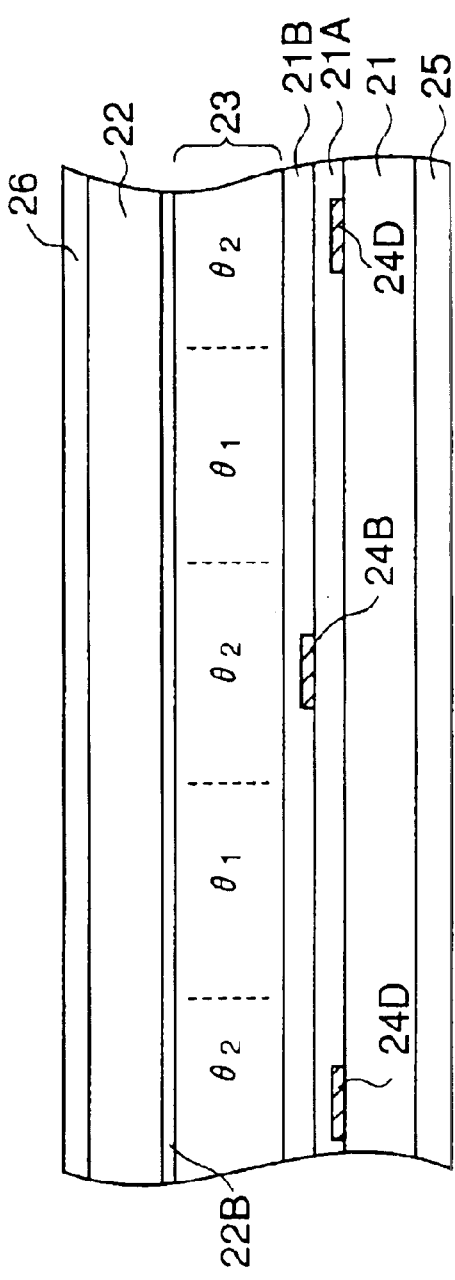
FIGS. 4A and 4B are diagrams showing a modification of the IPS liquid crystal display device of the first embodiment.
Figure 4B:
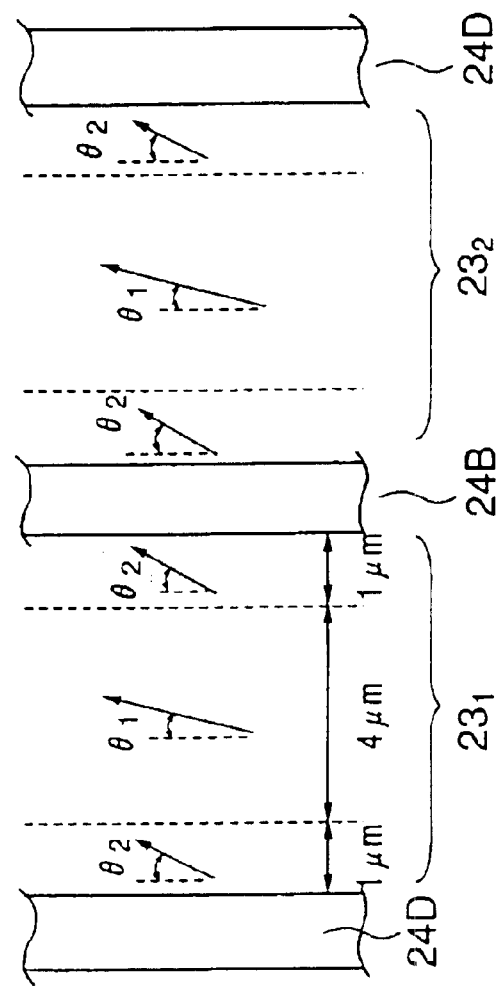

It is of course possible to align the liquid crystal molecules in the same direction in the pixel region $23_1$ and in the pixel region $23_2$ as represented in FIGS. 4A and 4B. In the construction of FIGS. 4A and 4B, the domain structure of the pixel region $23_1$ is repeated in the pixel region $23_2$. As other features of FIGS. 4A and 4B are identical with those of FIGS. 3A and 3B, further description thereof will be omitted.

Second Embodiment

Meanwhile, it is important to use a liquid crystal having a large initial resistivity for the liquid crystal layer 23 in order to secure a reliable and stable operation of a liquid crystal display device. On the other hand, the use of such a liquid crystal of large initial resistivity in an IPS liquid crystal display device tends to cause the problem of sticking of images or afterimage as mentioned previously.

In order to overcome the foregoing problem, the present embodiment reduces the resistance of the liquid crystal, which has a large initial resistivity, by exposing the molecular alignment films 21B and 22B with a ultraviolet radiation at the time of fabrication of the liquid crystal display device. Thereby, by using a polarized ultraviolet beam for this purpose, it is possible to set the direction of alignment of the liquid crystal molecules, which is caused by the molecular alignment films 21B and 22B, such that the liquid crystal molecules are aligned coincident to the plane of polarization of the polarized ultraviolet beam.

TABLE I below shows the result of experiments with regard to the sticking of images conducted on the IPS liquid crystal display device 20 of FIGS. 2A and 2B for the case in which a polarized ultraviolet beam is applied to the molecular alignment

TABLE I

|  | EXP-1 | EXP-2 | EXP-3 | COMP |
|---|---|---|---|---|
| INITIAL | GOOD | GOOD | GOOD | GOOD |
| AFTER 12 H | GOOD | GOOD | GOOD | BAD |
| AFTER 24 H | FAIR | GOOD | GOOD | BAD |
| RUNNING | GOOD | GOOD | GOOD | GOOD |

Referring to TABLE I, the Experiment-1 (EXP-1) is conducted by using the AL1054 molecular alignment film of Japan Synthetic Rubber, K. K. for the molecular alignment films 21B and 22B and irradiating thereto a polarized ultraviolet beam uniformly with a dose of about 6 J/cm$^2$. The glass substrates carrying the molecular alignment films 21B and 22B thus processed, are used to assemble a liquid crystal panel, and the liquid crystal display device 20 is formed by introducing a liquid crystal mixture of a high-resistivity liquid crystal into the liquid crystal panel as the liquid crystal layer 13. The liquid crystal mixture used in the Experiment-1 contains exclusively a fluoric liquid crystal component and a neutral liquid crystal component and is characterized by a dielectric anisotropy $\Delta\epsilon$ of 8.0 and the initial resistivity of about $1\times10^{14}\Omega cm$. In the liquid crystal display device 20 used in this experiment, there is no domain structure formed, contrary to the embodiment of FIGS. 3A and 3B or FIGS. 4A and 4B.

For the sake of comparison, a liquid crystal display device is formed with the same structure as the liquid crystal display device 20 of FIGS. 2A and 2B, except that the ultraviolet radiation is omitted.

In this Comparative Experiment, the molecular alignment films 21B and 22B are subjected to a rubbing process.

In the experiment of TABLE I, the degree of image sticking was evaluated visually after displaying a stationary pattern image at 50° C. continuously for 12 hours and 24 hours. Further, a running test was conducted in which the existence of non-uniformity in image representation was examined after continuous running operation for 500 hours at 50° C.

Referring to TABLE I, it can be seen that a distinct sticking of images was observed in the Comparative Experiment after 12 hours or 24 hours of operation. On the other hand, in the case of the Experiment-1, no image sticking was observed at all after 12 hours. Further, no image sticking was observed after 24 hours, as long as the liquid crystal display device is viewed from the front direction. When viewed from an oblique direction, on the other hand, appearance of a minor image sticking was observed in the experiment-1 when the liquid crystal display device is viewed from an oblique direction.

In the Experiment-2 (EXP-2), on the other hand, the sub-region $\theta_1$ of FIGS. 3A and 3B was exposed to the polarized ultraviolet beam with a dose of about 6 J/cm$^2$ while the sub-region $\theta_2$ was exposed to the same polarized ultraviolet beam with a dose of about 12 J/cm$^2$. In this experiment, the polarization plane was not changed between the case of exposing the sub-region $\theta_1$ and the case of exposing the sub-region $\theta_2$. Thus, the direction of liquid crystal molecular alignment is the same between the sub-region $\theta_1$ and the sub-region $\theta_2$ in the Experiment-2.

As will be noted from TABLE I, the problem of image sticking was eliminated in any of the initial state, after 12 hours, and after 24 hours. Further, no image sticking or non-uniformity was observed in the running test.

In the Experiment-3 (EXP-3), a process similar to the process of the Experiment-2 is conducted, except that a mask process is used in the step of exposing the sub-region $\theta_2$ with the polarized ultraviolet beam, wherein the polarization plane of the polarized ultraviolet beam is changed when exposing the sub-region $\theta_2$ with respect to the case of exposing the sub-region $\theta_1$ Thus, a domain structure similar to the one shown in FIGS. 3A and 3B or 4A and 4B is formed in the liquid crystal layer 23 in the Experiment-3. In the Experiment-3, too, the exposure dose of the sub-region $\theta_2$ is set to 12 J/cm$^2$, which is twice as large as the exposure dose used for the sub-region $\theta_1$.

As can be seen from TABLE I, the problem of image sticking is totally eliminated in any of the initial state, after 12 hours, after 24 hours, and the running test for 500 hours. It should be noted that the liquid crystal display device used in the Experiment-3 provides an improved response speed due to the domain structure represented in FIGS. 3A and 3B or FIGS. 4A and 4B.

Third Embodiment

FIG. 5 shows the construction of a liquid crystal display device 30 according to a third embodiment of the present invention, wherein those parts corresponding to the parts described previously are designated by the same reference numerals and the description thereof will be omitted.

Referring to FIG. 5, the liquid crystal display device 30 uses a high-resistivity liquid crystal mixture containing therein exclusively a fluoric liquid crystal component and a neutral liquid crystal component for the liquid crystal layer 23, wherein the resistance of the liquid crystal layer 23 is reduced by introducing thereinto an impurity material.

In the example of FIG. 5, an epoxy resin is provided on the surface of the spacers 31 that are distributed uniformly in the liquid crystal layer 23 so that an impurity material is released from the epoxy resin into the liquid crystal layer 23. In the case such spacers are introduced into 100 g of the liquid crystal mixture having a resistivity of about $1 \times 10^{14}$ Ωcm with an amount of 0.003 g and held at 100° C. for 60 minutes, the resistivity of the liquid crystal layer 13 is reduced to about $1 \times 10^{12}$ Ωcm.

Thus, in the present embodiment, an SVGA-TFT liquid crystal panel of the 11.3-inch size was fabricated based on the liquid crystal display device 30 of FIG. 5 and the sticking of images was examined for the liquid crystal display panel thus fabricated. According to the test conducted by the inventor, it was confirmed that a result similar to the Experiment-1 or Experiment-2 of TABLE I is obtained even in such a case the molecular alignment films 21B and 22B are processed by a rubbing process.

It should be noted that the desired decrease of the resistivity of the liquid crystal layer 23 is not limited to the introduction of impurity component released from the surface of the spacer 31 shown in FIG. 5, but may be achieve also by admixing a liquid crystal of low initial resistance such as the liquid crystal containing a CN component to the liquid crystal mixture of the liquid crystal layer 23. As a result of decrease of the resistivity in the liquid crystal layer 23, the problem of image sticking of the liquid crystal display device is effectively eliminated.

In the present invention, it should be noted that the liquid crystal mixture used for the liquid crystal layer 23 per se has a large resistance. Thus, the deterioration of the liquid crystal layer 23 caused by the dissolution of the seal is suppressed and the liquid crystal display device shows an improved, long-term reliability.

Fourth Embodiment

Figure 6:
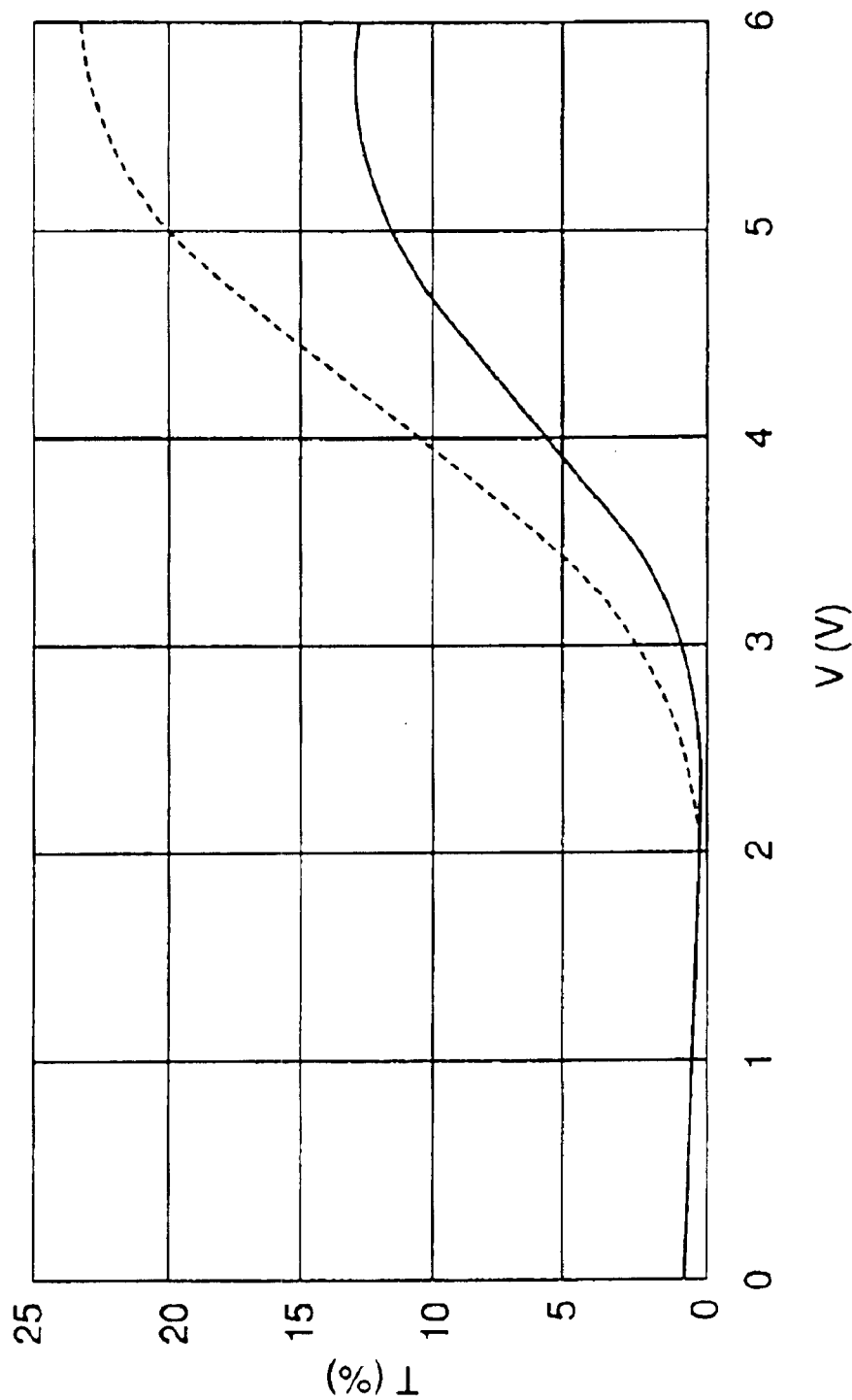
FIG. 6 is a diagram showing the electro-optic property of a conventional IPS liquid crystal display device.

FIG. 6 shows the electro-optic characteristic, more specifically the relationship between the driving voltage V and the transmittance T of a typical conventional IPS liquid crystal display device. In FIG. 6, the broken line shows the transmittance T as viewed from the front direction of the liquid crystal display device, while the continuous line shows the transmittance T as viewed from an oblique direction in which the azimuth angle is 135° and the polar angle is 60°.

Referring to FIG. 6, it can be seen that there appears a reversal in the relationship between the transmittance T and the driving voltage V, in the region where the driving voltage V is less than about 3 V, in that the transmittance T decreases with increasing driving voltage V.

Figure 7A:
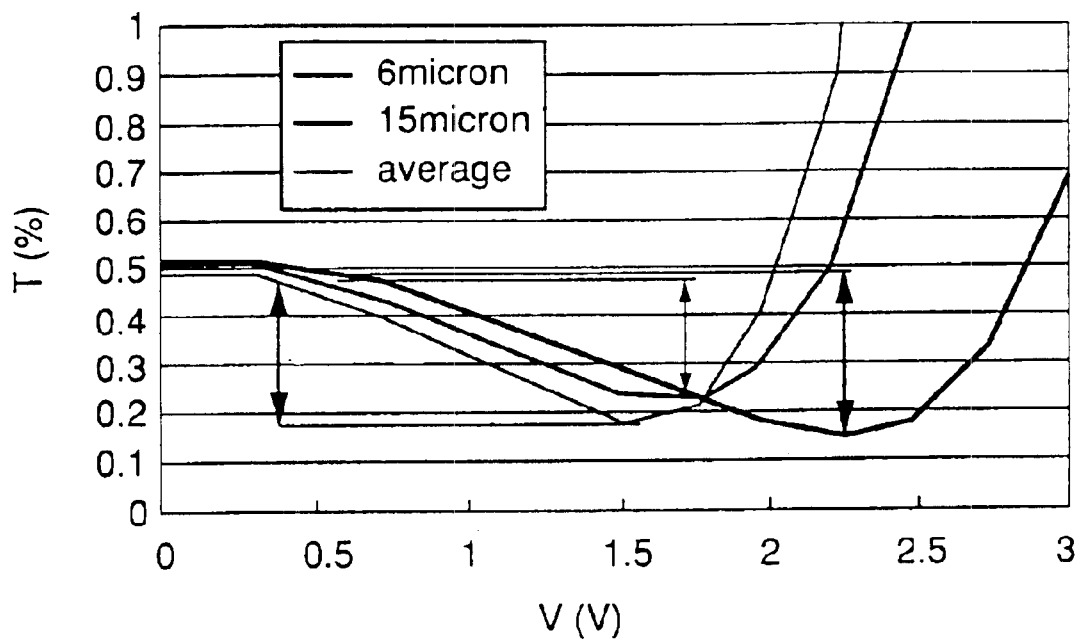
FIGS. 7A and 7B are diagrams showing the principle of an IPS liquid crystal display device according to a fourth embodiment of the present invention.
Figure 7B:
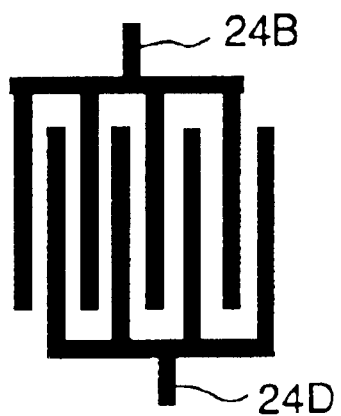

FIG. 7A shows the relationship between the transmittance T and the driving voltage V of an IPS liquid crystal display device having an interdigital electrode of FIG. 7B, wherein FIG. 7A shows the relationship in an enlarged scale in the voltage range lower than 3V. It should be noted that the interdigital electrode of FIG. 7B includes the pixel electrode 24B and the opposing electrode 24D of FIG. 2B in the state that each of the electrodes 24B and 24D has a plurality of electrode fingers extending parallel with each other.

Referring to FIG. 7A, it can be seen that, while the driving voltage V corresponding to the maximum inversion of the transmittance T changes between the case in which the interval between the electrode fingers is set to 6 μm and the case in which the interval is set to 15 μm, the average transmittance of these two cases shows a reduced magnitude of inversion as a result of the superposition of the two characteristic curves.

Thus, in the present embodiment, a plurality of regions of mutually different electro-optic characteristics are formed in each of the pixels of the IPS liquid crystal display 20 of FIG. 2A, so that the electro-optic characteristics are averaged in each pixel. As a result of the superposition of the electro-optic characteristics, the relationship between the transmittance T and the driving voltage V is averaged, and the problem of inversion of contrast, which tends to occur when the liquid crystal display device is viewed from an oblique direction, is minimized.

Figure 8A:
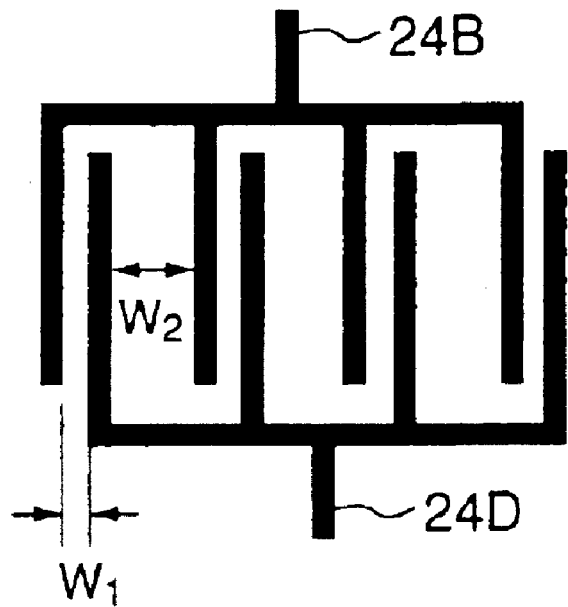
FIGS. 8A and 8B are diagrams showing examples of the electrodes used in the IPS liquid crystal display device of the fourth embodiment.

FIG. 8A shows the construction of an interdigital electrode used in the present embodiment for forming the regions of different electro-optic characteristics in a pixel.

Referring to FIG. 8A, the interdigital electrode has a construction generally similar to the interdigital electrode of FIG. 7B, except that the pixel electrode 24B and the opposing electrode 24D are displaced laterally to each other. As a result of such a laterally displaced construction of the electrodes 24B and 24D, there are formed a first electrode interval $W_1$ and a second electrode interval $W_2$ larger than the first electrode interval $W_1$ in the interdigital electrode. Thus, by using the interdigital electrode of FIG. 8A, it becomes possible to form the regions of different electro-optic properties in each pixel of the liquid crystal layer 23. Thereby, the liquid crystal display device of the present embodiment provides an improved viewing angle characteristic in which the inversion of contrast is minimized.

Figure 8B:
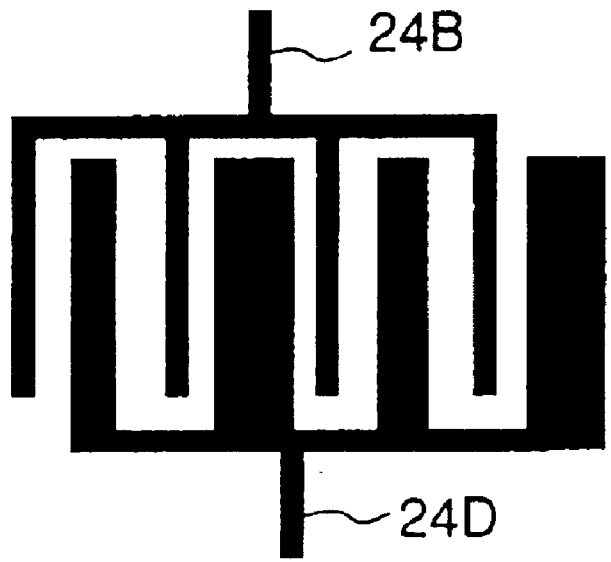

It will be noted that a similar result of improved viewing angle characteristic is achieved also by using the interdigital electrode of FIG. 8B.

Figure 9A:
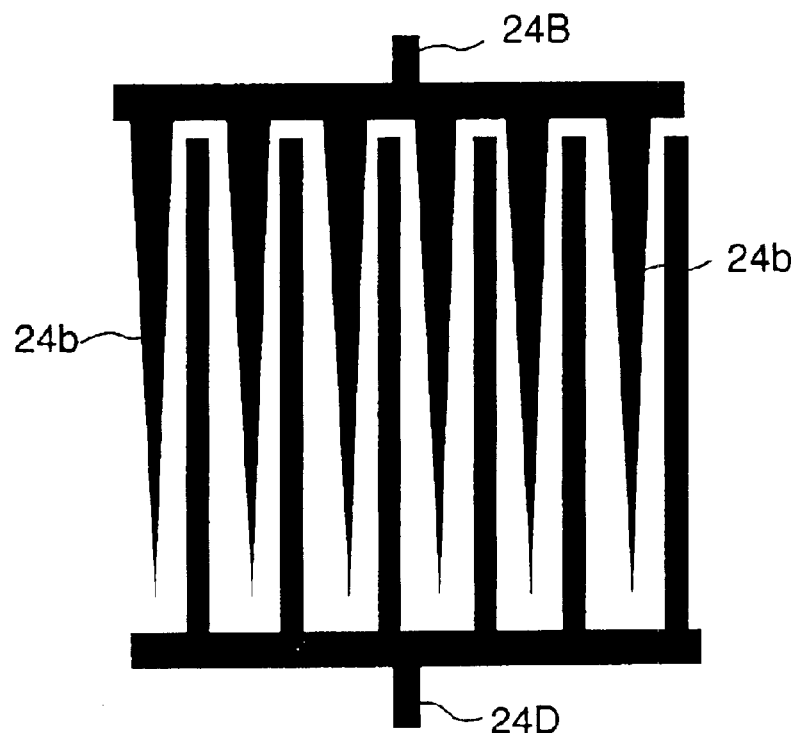
FIGS. 9A and 9B are diagrams further examples of the electrodes used in the IPS liquid crystal display device of the fourth embodiment.
Figure 9B:
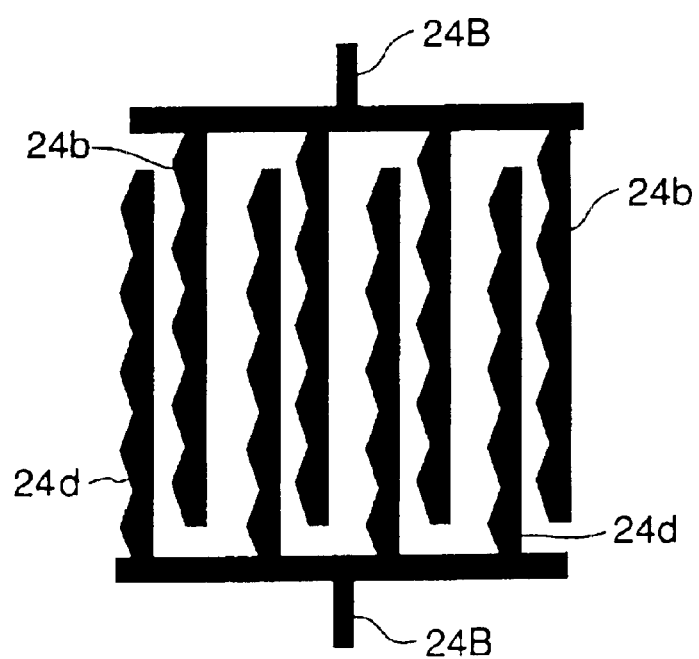

FIG. 9A shows an example of the interdigital electrode for use in an IPS liquid crystal display device, in which it will be noted that the electrode fingers 24b of the pixel electrode 24B are formed to have a tapered shape. Further, FIG. 9B shows another example in which the electrode fingers 24b of the pixel electrode 24B are formed to have a sawtooth pattern. In the example of FIG. 9B, the electrode fingers 24d of the opposing electrode 24D also have a sawtooth pattern. By using the interdigital electrode of FIG. 9B, the electro-optic characteristics are also averaged similarly to the example of FIG. 9A and the viewing angle characteristic of the IPS liquid crystal display device is improved.

Figure 10A:
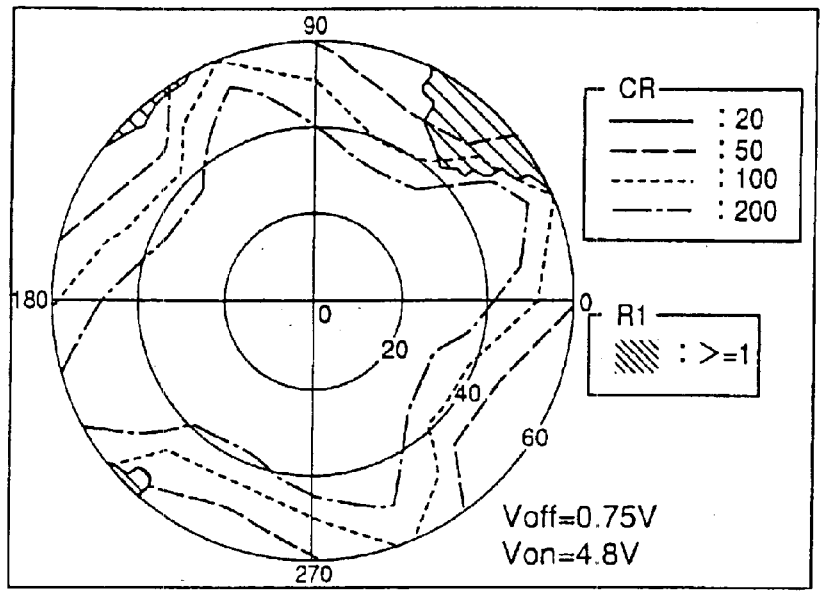
FIGS. 10A and 10B are diagrams showing the viewing angle of the IPS liquid crystal display device of the fourth embodiment in comparison with the viewing angle of a conventional IPS liquid crystal display device.
Figure 10B:
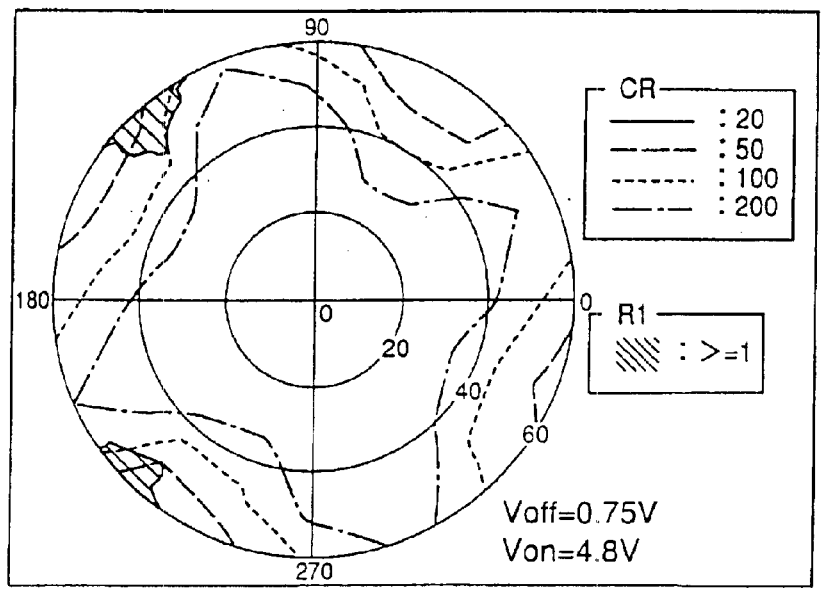

FIGS. 10A and 10B are diagrams showing the viewing-angle characteristics of the IPS liquid crystal display device of 15-inch size having a resolution of 1024×765, wherein FIG. 10A corresponds to the case in which the interdigital electrode of FIG. 7B is used, while FIG. 10B corresponds to the case in which the interdigital electrode of FIG. 8A is used. In FIGS. 10A and 10B, the contours represent the contrast ratio CR.

Referring to FIG. 10A, it can be seen that the liquid crystal display device has an excellent viewing angle characteristic, while it is still noted that there is an inversion of contrast occurring in the azimuth angle of 45°.

In the case of FIG. 10B, on the other hand, it can be seen that the contrast inversion occurring in the azimuth angle of 45° is vanished.

Figure 11:
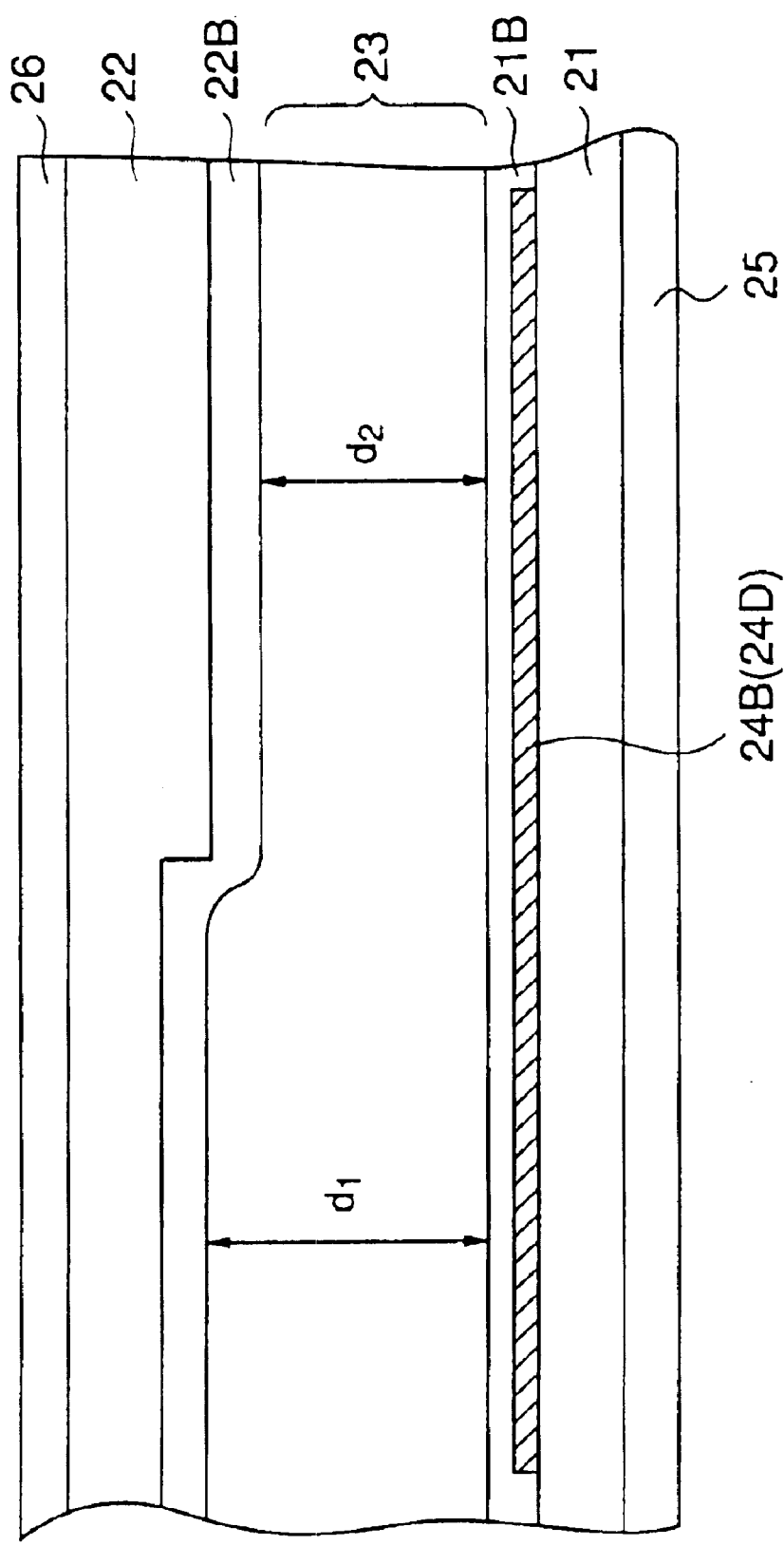
FIG. 11 is a diagram showing another construction of the IPS liquid crystal display device of the fourth embodiment of the present invention.

It should be noted that there are other various ways to form plurality of regions of different electro-optic characteristics in the pixel region. For example, FIG. 11 shows the case in which the thickness of the liquid crystal layer 13 is changed within a pixel, wherein it should be noted that FIG. 11 represents the cross-section crossing the pixel electrode 24B or the opposing electrode 24D in the direction of the source bus line. In FIG. 11, those parts corresponding to the parts described previously are designated by the same reference numerals and further description thereof will be omitted.

Figure 12:
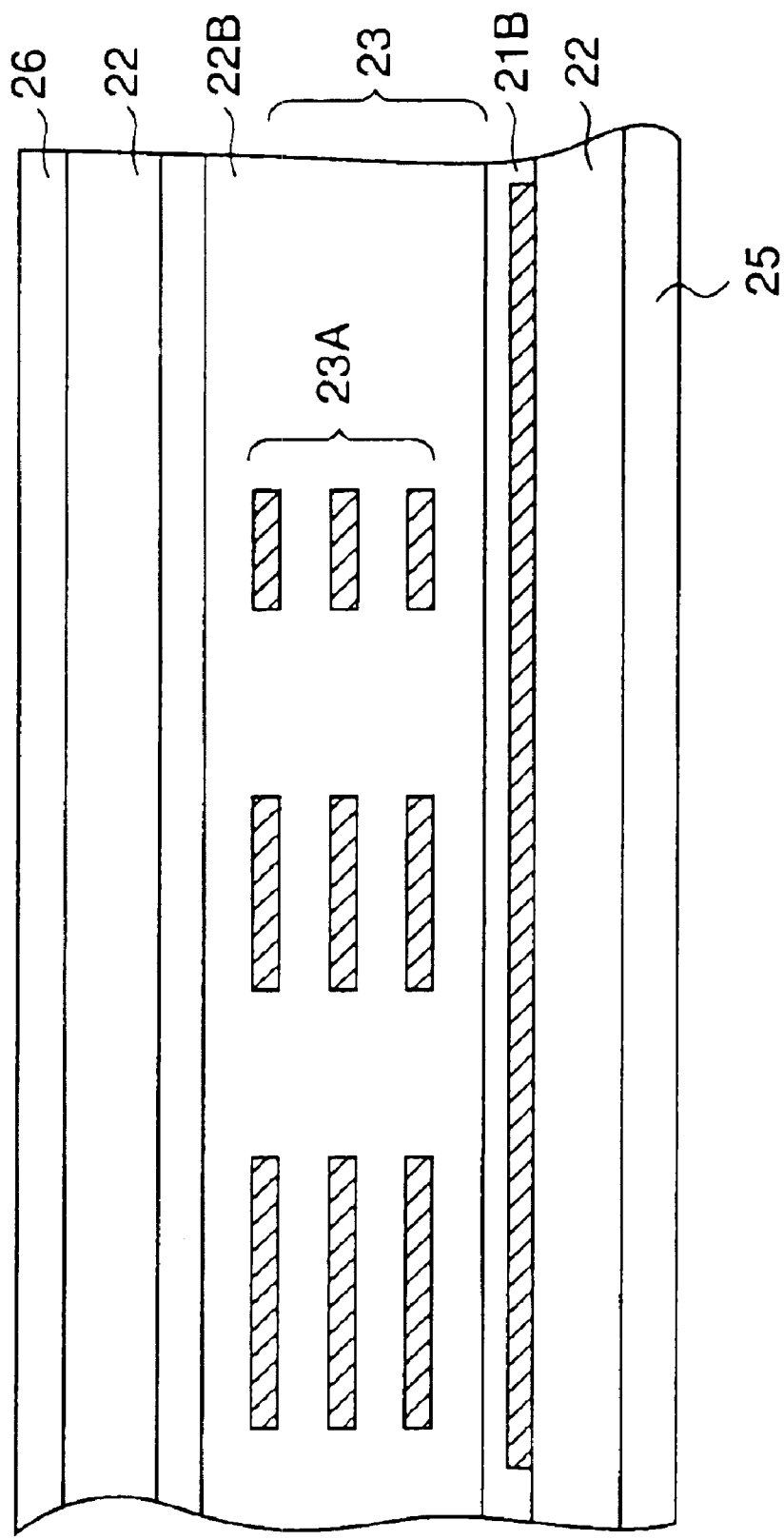
FIG. 12 is a diagram showing further construction of the IPS liquid crystal display device of the fourth embodiment.

FIG. 12 shows an example in which the direction of the liquid crystal molecules in the non-activated state of the liquid crystal display device is changed within a pixel. It should be noted that FIG. 12 represents the cross-section crossing the pixel electrode 24B or the opposing electrode 24D in the direction of the source bus line. In FIG. 12, too, those parts corresponding to the parts described previously are designated by the same reference numerals and further description thereof will be omitted.

Figure 13:
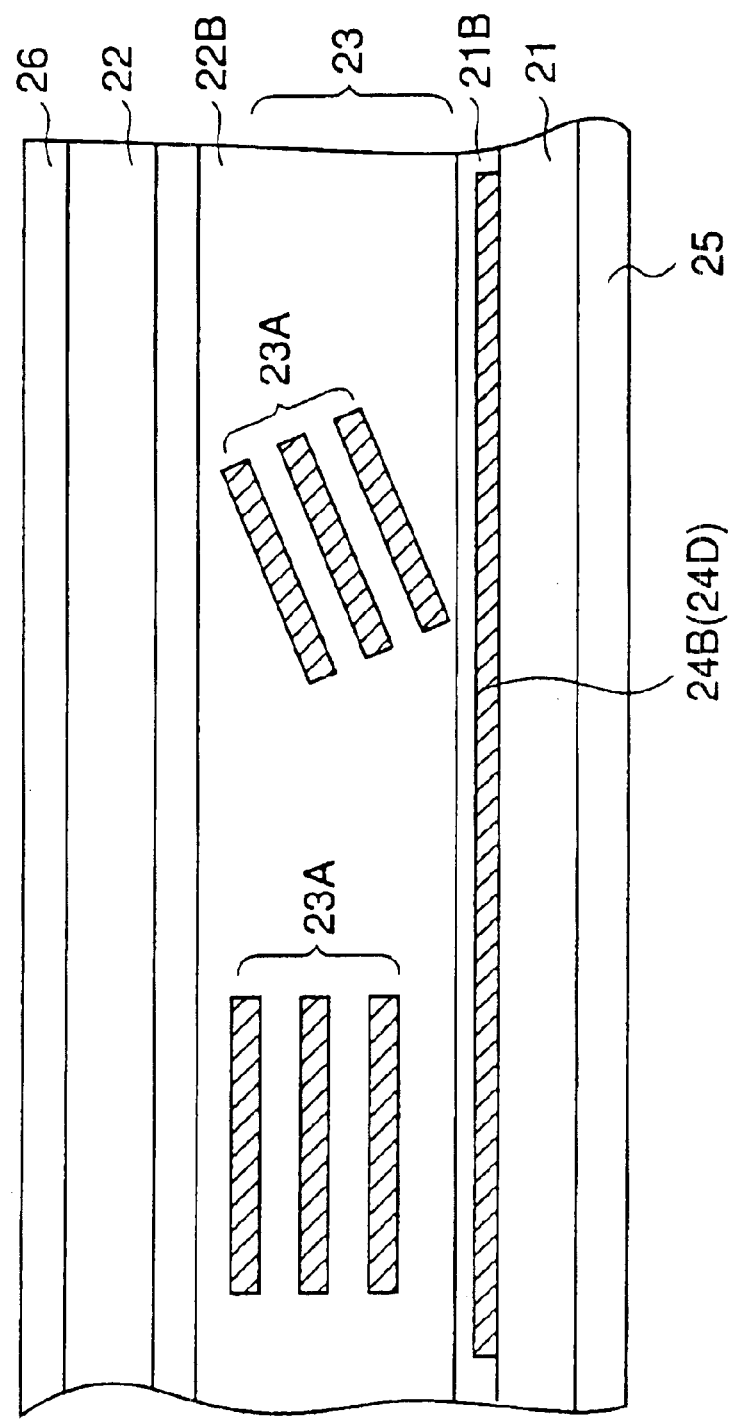
FIG. 13 is a diagram showing still further construction of the IPS liquid crystal display device of the fourth embodiment.

Be Further, FIG. 13 shows another example of achieving the effect of the present embodiment by changing the tilting direction of the liquid crystal molecules within a pixel. It should be noted that FIG. 13 represents the cross-section crossing the pixel electrode 24B or the opposing electrode 24D in the direction of the source bus line. In FIG. 13, too, those parts corresponding to the parts described previously are designated by the same reference numerals and further description thereof will be omitted.

Further, the present invention is not limited to the embodiments described heretofore, but various variations and modifications may be made without departing from the scope of the present invention.

What is claimed is:

1. A liquid crystal display device, comprising:

first and second, mutually opposing substrates;

a liquid crystal layer confined between said first and second substrates;

an electrode structure formed on said first substrate so as to create an electric field acting generally parallel to a plane of said liquid crystal layer; and a plurality of pixels being defined in said liquid crystal layer, each of said plurality of pixels including therein a plurality of domains having respective orientations for liquid crystal molecules, such that said orientation is different between a domain and another domain within said plane of said liquid crystal layer, wherein each of said plurality of pixels is formed in correspondence to said electrode structure, said electrode structure comprising a first electrode and a second electrode formed on said first substrate with a mutual separation, said plurality of domains including a first domain adjacent to said first electrode, a second domain adjacent to said second electrode, and a third domain intervening between said first domain and said second domain, said liquid crystal molecules aligning, in said first and second domains, in a first direction forming a first angle with respect to a direction of said electric field within said plane of said liquid crystal layer, said liquid crystal molecules aligning, in said third domain in a second direction forming a second angle with respect to said direction of said electric field within said plane of said liquid crystal layer, wherein said second angle is larger than said first angle.

2. A liquid crystal display device as claimed in claim 1, wherein said second angle is larger than about 50° and smaller than about 75°.

3. A liquid Crystal display device as claimed in claim 1, wherein said first and second electrodes extend parallel with each other, said first and second directions being in a symmetric relationship between a pair of mutually neighboring pixels with respect to an elongating direction of said first and second electrodes.

4. A liquid crystal display device as claimed in claim 1, wherein said liquid crystal layer has an initial resistivity of about $1\times10^{13}\Omega cm$ or more.

5. A liquid crystal display device as claimed in claim 4, wherein said liquid crystal layer has a resistivity substantially smaller than said initial resistivity.

* * * * *

UNITED STATES PATENT AND TRADEMARK OFFICE
CERTIFICATE OF CORRECTION

PATENT NO. : 6,741,310 B1  
DATED : May 25, 2004  
INVENTOR(S) : Seiji Tanuma et al.

Page 1 of 1

It is certified that error appears in the above-identified patent and that said Letters Patent is hereby corrected as shown below:

Title page,
Item [75], Inventors, delete "Yohei Nakanishi."

Column 10,
Line 52, delete "Crystal" and insert -- crystal -- therefor.

Signed and Sealed this

Eighth Day of February, 2005

JON W. DUDAS  
*Director of the United States Patent and Trademark Office*